(12) United States Patent
Rose

(10) Patent No.: US 6,357,311 B1
(45) Date of Patent: Mar. 19, 2002

(54) ELECTRICAL TRANSMISSION RANGE SHIFT SYSTEM WITH NON-CONTINUOUS DUTY SOLENOID VALVE

(75) Inventor: Jonathan S. Rose, Laurinburg, NC (US)

(73) Assignee: ZF Meritor, Laurinburg, NC (US)

( * ) Notice: Subject to any disclaimer, the term of this patent is extended or adjusted under 35 U.S.C. 154(b) by 0 days.

(21) Appl. No.: 09/501,949

(22) Filed: Feb. 10, 2000

(51) Int. Cl.⁷ .............................................. F16H 59/00
(52) U.S. Cl. ...................................................... 74/335
(58) Field of Search .................................... 74/335, 745

(56) References Cited

U.S. PATENT DOCUMENTS

| | | | |
|---|---|---|---|
| 4,566,355 A | | 1/1986 | Sugano ......................... 74/869 |
| 4,587,887 A | | 5/1986 | Shibayama et al. ........... 91/469 |
| 5,092,187 A | * | 3/1992 | Irwin ........................... 74/335 |
| 5,101,942 A | * | 4/1992 | Pruss et al. ............... 74/335 X |
| 5,186,066 A | * | 2/1993 | Pankratz et al. ............... 74/335 |
| 5,199,311 A | * | 4/1993 | Muyskens et al. ............. 74/335 |
| 5,222,404 A | * | 6/1993 | Stine ........................... 74/335 |
| 5,231,895 A | * | 8/1993 | Stine ....................... 74/335 X |
| 5,239,897 A | * | 8/1993 | Zaiser et al. .................. 74/335 |
| 5,337,625 A | | 8/1994 | Jang ............................ 74/335 |
| 5,545,099 A | | 8/1996 | Jang ............................ 475/135 |
| 5,622,080 A | * | 4/1997 | Furukawa ..................... 74/335 |
| 5,667,044 A | * | 9/1997 | Choi ........................ 74/335 X |
| 5,846,159 A | * | 12/1998 | Janecke et al. ........... 74/335 X |
| 5,879,258 A | | 3/1999 | Stevenson et al. .......... 475/135 |
| 5,899,121 A | * | 5/1999 | Mulvihill et al. ......... 74/335 X |
| 5,951,439 A | | 9/1999 | Jang ............................ 477/133 |

FOREIGN PATENT DOCUMENTS

| | | | | |
|---|---|---|---|---|
| JP | 405223159 | * | 8/1993 | .................. 74/335 |
| RU | 637291 | * | 12/1978 | .................. 74/335 |

* cited by examiner

*Primary Examiner*—Charles A. Marmor
*Assistant Examiner*—Roger Pang
(74) *Attorney, Agent, or Firm*—Carlson, Gaskey & Olds

(57) ABSTRACT

A vehicle transmission assembly includes a main gear box and an auxiliary gear box assembly, such as a range gear box. The range gearbox is shifted by an Electric Over Air (EOA) system that includes an air supply, a controller and a single solenoid. The solenoid valve is selectively operated by the controller which includes a timer function. When the driver actuates the range switch, the solenoid valve is energized for a predetermined period of time until the shift has been accomplished. Upon completion of the shift, the controller deenergizes the solenoid valve which then returns to a neutral condition.

18 Claims, 1 Drawing Sheet

ELECTRICAL TRANSMISSION RANGE SHIFT SYSTEM WITH NON-CONTINUOUS DUTY SOLENOID VALVE

BACKGROUND OF THE INVENTION

The present invention generally relates to a unique electric over air (EOA) shift system for a vehicle transmission assembly. More particularly, this invention provides a single non-continuos duty solenoid valve which reduces packaging requirements within the vehicle.

Heavy-duty vehicle transmissions typically provide the ability to engage a large number of gear ratios for driving the vehicle. Usually, main transmission gearbox house a number of gears that are selectively engaged to achieve a particular gear ratio for optimal vehicle performance. An auxiliary or range gearbox is often additionally provided to increase the number of available gear ratios. The range gearbox typically includes one or more range gears that are selectively engaged by an pneumatic system to operate the transmission in one of several ranges. Usually the range gearbox includes a low range and a high range. For example, the low range is typically associated with the lower gears in the transmission such as first through fifth gear. When the range gear box is switched into the high range, the same gears in the transmission main gear box that were used for first through fifth gear are now used for sixth through tenth gear.

Range gearbox assemblies are typically attached to a transmission main gearbox housing. A shaft from the main gearbox is coupled to a shaft for the range gearbox. One recent development is the use of electric controls for air cylinders to power the range function. These so-called electric over air gearbox configurations include a range gearbox housing containing the range gears, a range piston housing containing the range actuation piston, two solenoids, an air supply, and a range selection switch.

The solenoids allow selective communication of air from the air supply to either side of the range piston. By actuating the range piston the high range or low range gears are selected. The solenoids are continuous duty solenoids. In other words, the solenoid valve is always energized to either an open or a closed position.

After the operator has shifted through the low gear range, the range selection switch may be activated. When the switch is activated a first solenoid is opened to atmosphere and the second solenoid communicates air from the air supply to the range piston. The piston thereby shifts the range gearbox into the high gear range so that the same gears in the transmission main gearbox that were used for low range are now used for the high range. Similarly, to shift into the low gear range the second solenoid is opened to atmosphere and the first solenoid communicates air from the air supply to the range piston. The piston thereby shifts the range gearbox into the low gear range.

This range system configuration requires space for two solenoids. There is limited space available in the vehicle. Mounting the two solenoids so that they are located between the air regulator and the range piston housing takes up valuable space. Also, because the solenoids are continuous duty they must be constantly supplied with electricity. This requires a large magnetic coil which requires additional space and must typically be provided in an open location to receive an airflow for cooling. This type of gearbox configuration therefore has multiple packaging restrictions.

Thus, it is desirable to minimize the number of solenoid valves to provide a range system that is compact, reduces cost, and which provides for packaging advantages within the vehicle. Further, it would also be desirable to eliminate the requirement for continuous duty solenoids to reduce the constant stress on the solenoids. Maintenance requirements would thereby be reduced and the life of the range system would be increased.

SUMMARY OF THE INVENTION

A present invention provides a transmission having a unique EOA actuation system for an auxiliary transmission system such as a range system. A range system generally includes a range gearbox and a range piston housing which contains a range gearbox actuator. To shift the range gearbox a range switch on the transmission shift lever allows the vehicle driver to actuate a desired range shift. When the range gearbox is switched into a high range, for example, the same gears in the transmission main gear box that were used for first through fifth gear are now used for sixth through tenth gear.

In a preferred embodiment, the range gearbox is shifted by an EOA system that includes an air supply, a controller and a single solenoid. The solenoid is preferably a spring centered, 4-way solenoid. Because the solenoid is spring centered, its unenergized state is a neutral condition which maintains the actuator at its current position within the range piston housing without the necessity of maintaining the energization of the solenoid.

The solenoid is selectively operated by the controller. If the solenoid is provided with a voltage, the solenoid allows the communication of air to a first side of the range piston housing. If the voltage is reversed, air is directed to a second side of the range piston housing. The actuator is thereby accordingly shifted by the air pressure to shift the range gears.

The controller also includes a timer function. When the driver actuates the range switch, the solenoid valve is energized. The controller operates the appropriate valves to open the appropriate ports. The actuator is forced under air pressure to shift the range gearbox into the high or low range. Because the actuator does not reach its full travel immediately the controller maintains the solenoid in an energized condition for a predetermined period of time until the shift has been accomplished. Upon completion of the shift, the controller deenergizes the solenoid which then returns to its neutral condition.

The configuration of the present invention provides significantly improved packaging which increases available space for other components. The controller also allows a single non-continuos duty solenoid to replace the pair of continuous duty solenoids in known systems. The non-continuos duty solenoid also reduces maintenance requirements while increasing the EOA system life.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
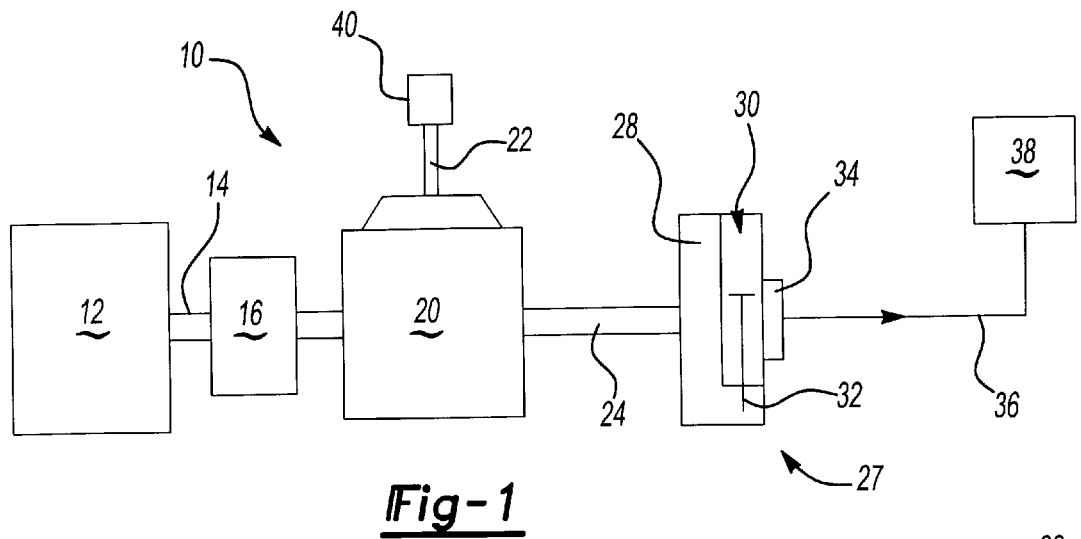
FIG. 1 is a schematic illustration of a transmission system.

FIG. 1 schematically illustrates a transmission assembly 10 for use in a vehicle. An engine 12 has an output shaft 14 that is selectively coupled through a clutch 16 to an input shaft 18 of a transmission main gear box 20. The transmission main gearbox 20 can be any conventional transmission gearbox. A shift lever 22 allows an operator to selectively engage gears within the main gearbox 20. In the preferred embodiment, the shift lever 22 is a manual stick shift lever. It should be noted, however, that assisted shift manual transmissions where a driver moves a shift lever to generate signals indicative of a desired gear change could also be used. Further, automated shift by-wire and automatic transmissions may also benefit from this invention.

A first shaft 24 from the transmission main gear box 20 provides a drive input to an auxiliary system 27 having an auxiliary gearbox 28. The auxiliary gearbox 28 is preferably a range gearbox 28 that provides the ability to operate the vehicle transmission assembly 10 in a high or low range, for example. Alternatively, a splitter-type auxiliary gear box may also benefit from this invention.

The auxiliary system 27 includes the range gearbox 28 and a range piston housing 30 which contains an actuator 32. Preferably, a sensor 34 monitors whether the vehicle transmission assembly 10 is operating in high or low range. The sensor 34 produces a range selection signal 36 which is transmitted to a controller 38.

The transmission assembly 10 includes an electrical actuation device that effects the gear changes within the range gearbox 28. The shift lever 22 preferably includes a range switch 40 that allows the driver of the vehicle to actuate a desired gear range. The range switch 40 preferably is configured so that the driver can specify whether the range gearbox 28 should shift into the high or low range. Alternatively or additionally, the range shift selection can be performed automatically depending on the ratio selected by the driver.

Figure 2:
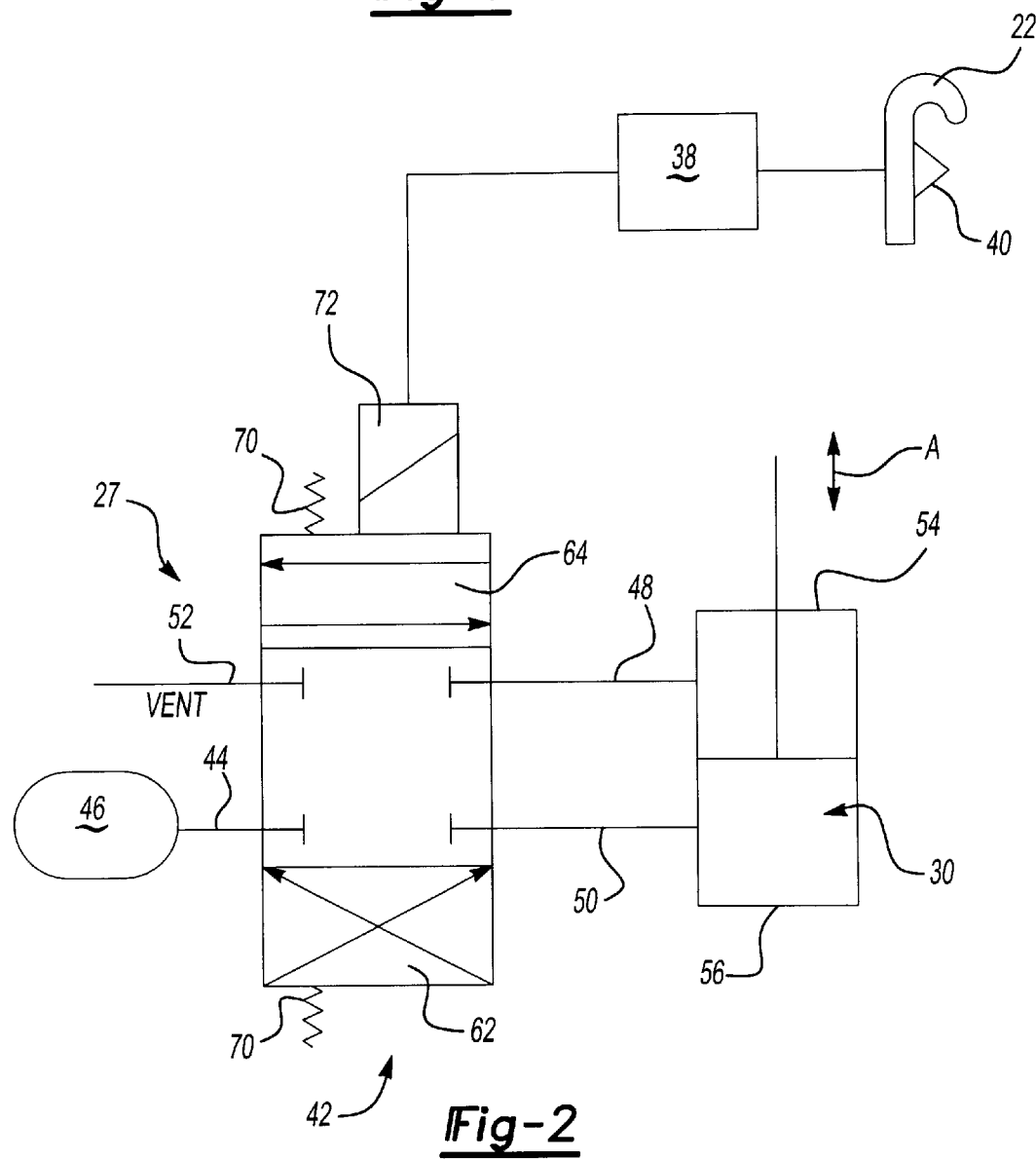
FIG. 2 is a schematic view representing the operation of the auxiliary gear box shift system.

FIG. 2 illustrates a schematic view of the auxiliary shift system 27. The range piston housing 30 contains the actuator 32 and is connected to a single solenoid valve 42. The solenoid 42 is preferably a 3 position spring centered, 4-way solenoid. The solenoid valve 42 is a 4-way solenoid because it includes four ports: an input port 44 connected to a vehicle air system such as an air tank 46; a first and second output port 48,50 connected to the range piston housing 30; and a vent port 52 which is connectable to atmosphere. Because the solenoid valve 42 is spring centered its unenergized state is a neutral condition, which is illustrated. That is, springs 70 maintain the solenoid valve 42 at the central neutral position. The neutral condition of the solenoid valve 42 blocks air from entering the range piston housing 30 from the air tank 46 while preventing air from exiting from the range piston housing 30 through the vent port 52. The neutral condition of the solenoid valve 42 thereby maintains the actuator 32 at its current position within the range piston housing 30 without the necessity of maintaining the energization of the solenoid valve 42.

The first and second output ports 48, 50 are selectably connected to the air tank 46 by energizing the solenoid 72. Preferably, solenoid 72 is in communication with, and controlled by the controller 38. The solenoid valve 42 controls movement of the actuator 32 by directing air from the air tank 46 to either the first 54 or second 56 side of the range piston housing 30 through the connections 48, 50 and through the solenoid 72. When a voltage is applied to the solenoid 72, the solenoid valve 42 directs air to a first 54 side of the range piston housing 30 through passages 48. At the same time the chamber 56 is connected to vent 52 through passage 50. When the voltage is reversed, the solenoid 72 directs air to a second 56 side of the range piston housing 30. At the same time chamber 54 is connected to vent 52 through passage 48. The actuator 32 is thereby accordingly shifted by the air pressure.

The shifting of the actuator 32 controls the shifting of the auxiliary or range gears. Thus, when the actuator 32 is moved back and forth as represented by the double arrow A in FIG. 2, either the high gear range or low gear range of the range gearbox assembly 28 (FIG. 1) is selected depending on the driver's input. If the low gear range is selected, then gears in the transmission main gear box 20 operate in the low range, such as first through fifth gear for example. When the actuator 32 actuates the high gear, the range gear box 28 is shifted into the high range and the same gears in the main gear box 20 that were used for the first through fifth gears are now used for the sixth through tenth gears, for example.

The sensor 30 (FIG. 1) monitors the range selection of the range gears, such as the high or low gear range, and produces the range selection signal 32 which is sent to the controller 38 (FIG. 1). This monitoring allows electronic transmission shift Wins systems, such as when the driver moves a shift lever to generate signals indicative of a desired gear change, to ensure that proper gear engagement is initiated so that the vehicle is operating under optimal conditions.

The controller 38 also preferably includes a timer function. When the driver actuates range switch 40, the solenoid 72 is energized. The controller 38 energizes the valve 42 connects the appropriate output port 48, 50 to passage 44 and opens the vent 52 to the appropriate chamber. The actuator 32 is thereby forced under air pressure toward the appropriate first or second position 62,64. However, the actuator 32 may not reach its full travel immediately. The controller 38 must maintain the solenoid 72 in an energized condition for a predetermined period of time until the actuator has completely reached the desired position. When the predetermined time has elapsed the controller 38 deenergizes the solenoid 72 which, under spring centering 70 returns the valve 42 to the illustrated neutral condition. In the neutral position, the actuator 32 is maintained in the position to which it has been previously driven. The controller 38 thereby allows the driver of the vehicle to initiate a desired range shift with a single switch activation. Further, the controller 38 allows a single non-continuous duty solenoid to replace a pair of continuous duty solenoids in known systems.

Solenoid valve 42 may be as known. Other type valves capable of moving between three positions may be used. The present invention provides an effective auxiliary transmission system that requires only a single solenoid to provide a range system that is compact, reduces cost, and which provides packaging advantages within the vehicle. Further, the present invention eliminates the requirement for continuous duty solenoids to reduce the constant stress on the solenoids. Maintenance requirements are reduced and the life of the range system is increased.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An auxiliary transmission system comprising:
   an actuator;
   a range gear box shiftable by said actuator between high and low range gears;
   an air supply communicatable with said actuator;
   a single solenoid valve positioned between said air supply and said actuator, and said solenoid valve is drivable between two activated positions and biased to a neutral position when in an unactivated state; and
   a controller in communication with said solenoid valve to selectively operate said solenoid valve between said two activated positions and control communication between said air supply and said actuator.

2. A system as recited in claim 1 wherein said solenoid valve is spring centered to said neutral position.

3. A system as recited in claim 2 wherein said solenoid valve is a 3 position 4-way solenoid valve.

4. A system as recited in claim 1 wherein said auxiliary gear box is a range gear box shiftable between high and low range gears.

5. A system as recited in claim 4 wherein said actuator is a range piston, said range piston operable to shift said range gear box between said high and low gears.

6. A system as recited in claim 1 wherein said controller includes a timer to actuate said solenoid valve for a predetermined period of time.

7. A system as recited in claim 1 further comprising a switch on a gear shifter handle, said switch in communication with said controller.

8. A vehicle transmission assembly comprising:
   a main gear box having a first shaft;
   an auxiliary gear box having a second shaft operatively coupled to said first shaft, said auxiliary gear box having gears operably associated with said second shaft;
   an actuator for shifting between said gears;
   an air supply communicatable with said actuator;
   a single solenoid valve positioned between said air supply and said actuator, and said solenoid valve drivable between two activated positions and spring biased to a neutral position when in an inactivated state; and
   a controller in communication with said solenoid valve to selectively operate said solenoid valve between said two activated positions to control communication between said air supply and said actuator.

9. A vehicle transmission assembly as recited in claim 8 wherein said solenoid valve is a 3 position 4-way solenoid.

10. A vehicle transmission assembly as recited in claim 8 wherein said actuator is a range piston, said range piston operable to shift a range gear box between a high and low gears.

11. A vehicle transmission assembly as recited in claim 8 wherein said controller includes a timer to actuate said solenoid valve for a predetermined period of time.

12. A vehicle transmission assembly as recited in claim 8 further comprising a switch on a gear shifter handle, said switch in communication with said controller.

13. A system as recited in claim 1 wherein said solenoid is driven to one of said two activated positions when a voltage is applied to said solenoid, and said solenoid is driven to the other of said two activated positions when said voltage is reversed.

14. A system as recited in claim 1 wherein said solenoid directs air to a first side of said actuator to drive said actuator in a first direction when a voltage is applied to said solenoid, and said solenoid directs air to a second side of said actuator to drive said actuator in a second direction when said voltage is reversed.

15. A vehicle transmission assembly as recited in claim 8 wherein said solenoid is driven to one of said two activated positions when a voltage is applied to said solenoid, and said solenoid is driven to the other of said two activated positions when said voltage is reversed.

16. A vehicle transmission assembly as recited in claim 8 wherein said solenoid directs air to a first side of said actuator to drive said actuator in a first direction when a voltage is applied to said solenoid, and said solenoid directs air to a second side of said actuator to drive said actuator in a second direction when said voltage is reversed.

17. An auxiliary transmission system comprising:
    an actuator;
    an auxiliary gear box shiftable by said actuator;
    an air supply communicatable with said actuator;
    a single solenoid valve positioned between said air supply and said actuator, and said solenoid valve is drivable between two activated positions and biased to a neutral position when in an unactivated state;
    a controller in communication with said solenoid valve to selectively operate said solenoid valve between said two activated positions and control communication between said air supply and said actuator; and
    a timer to actuate said solenoid valve for a predetermined period of time.

18. An auxiliary transmission system comprising:
    an actuator;
    a splitter gear box shiftable by said actuator;
    an air supply communicatable with said actuator;
    a single solenoid valve positioned between said air supply and said actuator, and said solenoid valve is drivable between two activated positions and biased to a neutral position when in an unactivated state; and
    a controller in communication with said solenoid valve to selectively operate said solenoid valve between said two activated positions and control communication between said air supply and said actuator.

* * * * *